United States Patent [19]
Crosby et al.

[11] 3,833,145
[45] Sept. 3, 1974

[54] QUICK-RESPONDING THERMOMETER

[75] Inventors: Philip C. Crosby, Wakefield; Robert J. Goyette, Chelmsford, both of Mass.

[73] Assignee: Meditech Energy and Environmental Corporation, Danvers, Mass.

[22] Filed: Feb. 16, 1970

[21] Appl. No.: 11,615

[52] U.S. Cl.................. 220/64, 29/199, 73/362 AR
[51] Int. Cl.......................... B65d 25/14, G01k 7/00
[58] Field of Search................ 220/64; 29/194, 199; 73/362 R, 362 AR

[56] References Cited
UNITED STATES PATENTS
3,295,087  12/1966  Landis............................. 73/362 AR
3,454,376  7/1969  Luce................................ 29/199 X

*Primary Examiner*—George E. Lowrance
*Attorney, Agent, or Firm*—Nolte and Nolte; C. Bruce Homburg; Edward B. Hunter

[57] ABSTRACT

A novel, quick-responding thermometer comprising a thin metallic container enclosing a thermosensitive element, said container being formed of (1) an inner metal of high thermal conduction and relatively low mechanical strength and (2) a coating thereover of another metal which is characterized by a relatively high mechanical strength, said latter metal advantageously forming not over about 20 percent of the total wall thickness of the probe.

8 Claims, 5 Drawing Figures

PATENTED SEP 3 1974  3,833,145

INVENTORS
PHILIP C. CROSBY
ROBERT J. GOYETTE
BY
Cesari and McKenna
ATTORNEYS

QUICK-RESPONDING THERMOMETER

BACKGROUND OF THE INVENTION

1. Field of the Invention:

This invention relates to quick-responding temperature-sensing apparatus which is particularly useful for taking temperatures of patients in hospitals, etc.

2. Description of the Prior Art:

Most people are familiar with the conventional glass-tube thermometers used for measuring the temperature of patients in hospitals, doctor's offices and other such places. These thermometers enclose evacuated tubes in which various materials can expand to indicate, on a calibrated scale, the temperature of the patient.

Such devices have certain drawbacks. For example, it takes some minutes before they are heated sufficiently to equilibrate the glass and liquid contained therein at the temperature of the patient's mouth. It should be apparent that quicker-responding thermometers are desirable. Nevertheless, there has not heretofore been a fully satisfactory solution to the problem of providing a suitably inexpensive, quick-responding temperature indicator that is sufficiently accurate to be generally acceptable. One problem has been to provide a quick-responding thermometer probe which would not dissipate an excessive quantity of heat (as by conduction, radiation, or both) along the length thereof and yet would be of sufficient mechanical strength to withstand normal handling and abuse.

SUMMARY OF THE INVENTION

Therefore, it is an object of the instant invention to provide an improved, quick-responding thermometer.

Another object of the invention is to provide a novel probe, or container, within which a thermosensitive element may be suitably contained.

A further object of the invention is to provide a novel process for making and calibrating a quick-responding thermosensitive device.

Still another object of the invention is to provide an improved read-out device for use in combination with the aforesaid thermosensitive device.

Other objects of the invention will be obvious to those skilled in the art on reading the instant application.

The above objects have been substantially achieved by construction of a thermosensitive probe comprising a novel container for enclosing a thermosensitive element. The element itself, when mounted in this container achieves the attributes of providing a quick and accurate response to the environment in which the probe is placed. This is achieved without sacrificing required mechanical strength of the probe. This container is formed of a thin wall of metal which wall is reinforced by a relatively thin layer of metal having very high mechanical strength. The inner material, when copper, comprises a major portion of the thickness of the wall of the container, preferably about 80 percent or more of its thickness. This arrangement accounts for the rapid response of a thermistor attached inside of the tube to heat flowing through the wall of the tube to the thermistor.

A small absolute cross-section of the inner metal minimizes the amount of heat which escapes away from the situs within the probe at which the temperature-sensitive element is located. The inner metal advantageously has a high heat conductivity but where the metal is thin enough so that the thermal lag therethrough is equivalent to that through 0.003 inches of copper, other metals may be used. Such a small cross-section (under 0.005 inches thick but most advantageously less than 0.003 inch) would be impractical from a structural point of view were it not for the reinforcing coat of metal.

The reinforcing metal is advantageously formed of two coatings, each less than 0.0002 inches thick.

The inner metal is preferably one having a heat conductivity of over about 0.65 calories per second per centimeter per degree Centigrade. Copper is preferred because of its superior mechanical properties, but gold and silver and highly conductive alloys are also advantageous.

The reinforcing metal should advantageously be selected from those having heat conductivities below about 0.2 calories per second per centimeter per degree Centigrade. Particularly advantageous metals for use in forming a metal coat are nickel-based metals, especially phosphorous-nickel alloys, e.g. those of 5–15 percent phosphorous. This phosphorous bearing nickel when applied in inner and outer coatings of 0.00015 inches thickness over a copper tube 0.002 inches in thickness will yield a tube two to five times stronger than when a 0.0003 mil coating of nickel is applied over the copper tubing. Moreover, such a material can be hardened to approximately the hardness of various carbide materials and thus has the additional advantage of being convertible into an extremely durable finish.

In practice, however, a gold flash is often used as a finish coat to provide minimum radiation characteristics and optimum resistance to the object. The gold flash is, typically only about 0.000001 inches thick. Other noble metals, such as rhodium and platinum, chrome, nickel, and the like may be used instead of gold in this application.

The rapid responding nature of the thermosensitive probe of the invention, and the low thermal conductivity along the length thereof, are most advantageous when the probe is in the form of the convention elongate cylinder normally used in oral and rectal type thermometers. This is because the response of the device is so fast that when it is placed in a fleshy portion at the back of a mouth, in instantly records the physiological temperature of interest. If placed near the front of the mouth, it would take some time for the mouth (not the thermometer) to come to proper equilibrium.

Another advantage of the thermometer of the invention is the process by which it is conveniently made to have a tolerance of about plus-or-minus 0.1°F. One advantage of such accuracy is that it permits the manufacture of standard probes which are interchangeable with one another. This obviously facilitates replacement in the field.

The reinforcing metal should be so selected that it at least doubles the yield strength of a copper tube having a 0.002 inch wall thickness when radial compressive forces are applied to such a tube having a 0.0002 inch inner and outer coatings of the reinforcing metal.

ILLUSTRATIVE EMBODIMENT OF THE INVENTION

In this application and accompanying drawings we show and described a preferred embodiment of the invention and suggest various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWINGS

Figure 1:
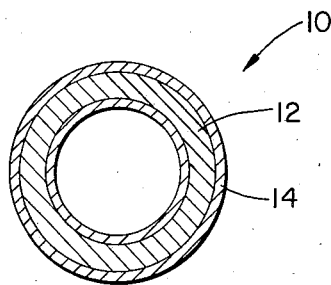
FIG. 1 is a cross section of a protective container of the temperature probe of the invention.

Referring to FIG. 1, it is seen that tube 10 for enclosing a thermosensitive element is about 2.75 inches long, about 0.125-inch in diameter and formed of a 0.0017-inch cylinder formed of copper. This cylinder has, on either side thereof, a coating 14 of about 0.00015 inches of a phosphorous-bearing nickel sold under the trade designation En Plate Ni-410 by Enthone, Inc. and applied to the copper tube according to this manufacturer's instructions.

Figure 2:
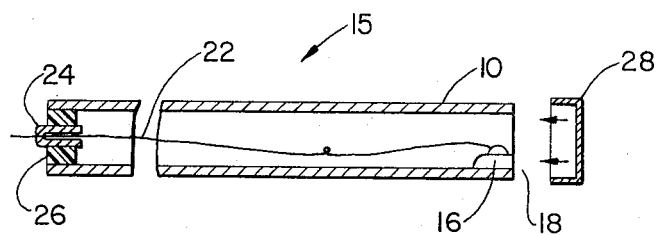
FIG. 2 is a schematic section of a thermosensitive probe constructed according to the invention.

FIG. 2 shows a tube 10 comprising a thermistor 16 soldered to the inner wall 14 thereof. The thermistor 16 is positioned near an end 18 of tube 10 so the tube can act as a moderating resistance to the abrading of the thermistor during its calibration which abrading is carried out with the thermistor in position and which abrading includes the concurrent abrasion of a small portion of tube 10.

The thermistor is formed of a pressed, sintered, and silvered material which is identifiable as Material T commercially available from Fenwal Electronics, Inc., of Waltham, Massachusetts. Material T is used in making some of Fenwal's interchangeable curve-matched thermistors sold under the trade designation UNICURVE. The characteristics of the material are described in Fenwal's Bulletin L-6 relating to the aforesaid UNICURVE thermistors.

Figure 4:
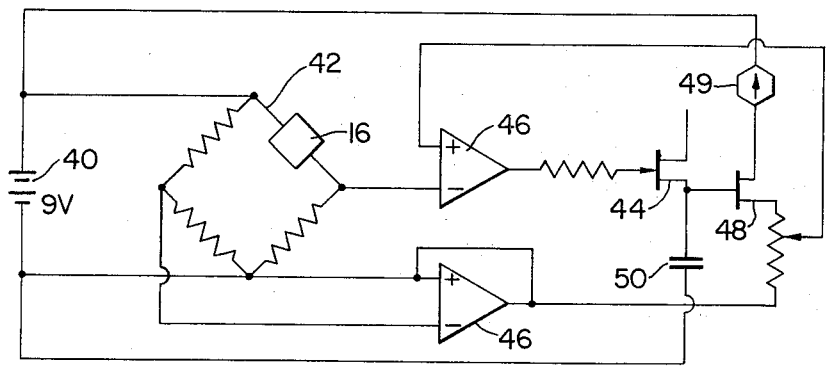
FIG. 4 is a circuit diagram particularly useful in construction of a thermometer according to the invention.

The thermistor 16 shown in FIG. 2 is suitably purchased as a disk 0.010 inches thick and 0.050 inches in diameter and then abraded to calibrate the thermistor for proper read out in a bridge circuit, e.g. the circuit shown in FIG. 4.

In the probe 15 shown in FIG. 2, the tube 10 forms one electrical lead from thermistor 16. The other electrical lead 22, soldered onto thermistor 16, is formed of a copper-clad iron-nickel alloy of the type known as Dumet wire. The material is particularly advantageous because the core thereof has a very low coefficient heat conductivity and thereby tends to allow a more rapid equilibration of thermistor 16.

Lead 22 is fastened through a crimp lead connector 24 which, in turn is held snugly within an insulator ring 26. A thin metal cap 28 is soldered onto tube 10 by use of a minimum quantity of low-melting solder. Cap 28 is not positioned until thermistor 16 has been carefully calibrated by abrasion with, for example, a 400–600 mesh silicon carbide abrasive paper.

Figure 3:
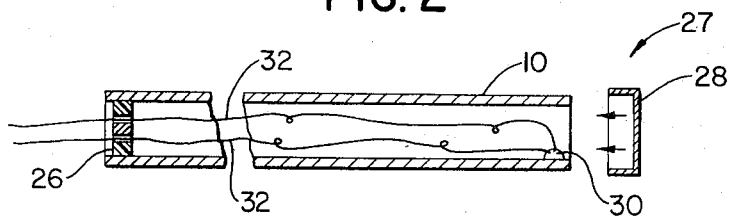
FIG. 3 is a schematic section of an alternative thermosensitive probe constructed according to the invention.

FIG. 3 discloses another thermo-sensitive probe 27 constructed according to the invention, and comprising a tube 10 closed with a cap 28. Probe 27, however, comprises a small glass bead thermistor 30 connected to Dumet leads 32. The connection of leads to the thermistor 30 is effected by use of small quantities of a high thermally-conductive, dielectric, oxide-loaded epoxy such as that sold under the trade designation EC-COCOAT 582 by the Emerson & Cumming Company.

The circuit itself is calibrated to the thermistor to adapt probes of the type shown in FIG. 3, rather than calibrating the thermistor itself.

Figure 5:
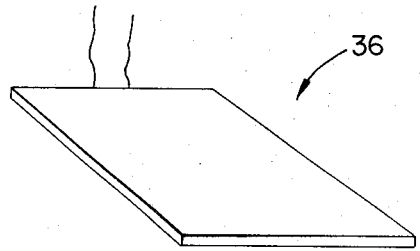
FIG. 5 is another embodiment of the invention comprising a disk-like container for a thermosensitive probe.

FIG. 5 shows a disk-shaped, thermosensitive probe 36 which is advantageous for some applications, e.g. where it is desired to monitor the temperature of a sleeping child by attaching the probe to the child's bed or bed linen. In such an application, the child's skin is not in contact with harmful adhesives used with most prior art devices.

The novel thermo-sensitive probes disclosed above, to be incorporated most advantageously in a thermometer in such a way as to take maximum advantage of the fast response thereof, may be utilized with the circuit described in FIG. 4.

This circuit has been found to minimize current drain on the capacitor used in a hold-circuit arrangement, to allow the use of less sensitive meter with a sensitive bridge circuit, to minimize the effect of self-heat in the thermistor by allowing use of very low bridge currents, to have good storage characteristics, i.e., to have capacitors with low-leakage characteristics, and to achieve the foregoing without seriously increasing the cost of the apparatus.

The circuit of FIG. 4 is characterized by use of a D.C. power source 40 to provide a regulated voltage to a Wheatstone bridge circuit 42 including therein a thermistor 16. The deviation across two operational amplifiers 46, whose relative drift character are self-compensating, drives a field effect transistor 44. A second field effect transistor 48 is placed in the circuit to avoid leakage from capacitor 50 and thus maintain a temperature reading on meter 49 during the period at which power is supplied from the voltage source. A certain number of equivalent circuit variations should be obvious to those skilled in the art. For example, the two operational amplifiers can be replaced by a single zero-drift device where such an arrangement is economical.

It is to be understood that the following claims are intended to cover all of the generic and specific features of the invention herein described.

What is claimed is:

1. In a temperature indicating device comprising a protective container enclosing a single temperature-sensitive element located proximate one end thereof, and in good thermal contact with said container, the improvement (a) wherein said container walls comprise a layer of a first metal, said first metal being of relatively high thermal conductivity mechanically reinforced with a relatively thin coating thereover of a second metal of inferior thermal conductivity but of superior mechanical strength and (b) wherein said thin layer of said first metal is less than about 0.005 inches thick, wherein the total thickness of said reinforcing metal is effective to contribute one-half of the compressive strength of said container, wherein said container is an elongate cylindrical probe having a minimum diameter of about one-eighth of an inch in diameter.

2. A temperature-indicating device as defined in claim 1, wherein said second metal is a phosphorus-bearing nickel alloy comprising a minimum of 5 percent phosphorus by weight.

3. A temperature-indicating device as defined in claim 1, wherein said first metal is a cuprous metal.

4. A temperature-indicating device as defined in claim 1, wherein said first metal has a thermal conductivity of 0.65 calories per second per cm. per ° C.

5. A temperature-indicating device as defined in claim 1 wherein said second metal has a thermal conductivity of less than about 0.2 calories per second per centimeter per degree Centigrade.

6. A temperature-indicating device as defined in claim 5 wherein said first metal is copper and said second metal is a phosphorous-bearing nickel alloy.

7. A temperature-indicating device as defined in claim 1 wherein
a. said high heat-conducting metal layer is characterized by a thermal lag equivalent to not over 0.003 inches of copper,
b. wherein said reinforcing metal is in the form at least one coating which is less than about 0.0003 inches thick.

8. A temperature indicator as defined in claim 1 comprising an exterior coating of a noble metal, rhodium, platinum, chrome or nickel.

* * * * *